(12) United States Patent
Duerre et al.

(10) Patent No.: US 12,379,010 B2
(45) Date of Patent: Aug. 5, 2025

(54) DAMPING APPARATUS AND METHOD FOR ASSEMBLY

(71) Applicant: Vibracoustic SE, Darmstadt (DE)

(72) Inventors: Markus Duerre, Neuenburg am Rhein (DE); Tim Fricker, Breisach am Rhein (DE)

(73) Assignee: Vibracoustic SE, Darmstadt (DE)

( * ) Notice: Subject to any disclaimer, the term of this patent is extended or adjusted under 35 U.S.C. 154(b) by 424 days.

(21) Appl. No.: 17/762,569

(22) PCT Filed: Jul. 29, 2020

(86) PCT No.: PCT/EP2020/071442
§ 371 (c)(1),
(2) Date: Mar. 22, 2022

(87) PCT Pub. No.: WO2021/058181
PCT Pub. Date: Apr. 1, 2021

(65) Prior Publication Data
US 2022/0333662 A1 Oct. 20, 2022

(30) Foreign Application Priority Data
Sep. 24, 2019 (DE) .......................... 102019125701.8

(51) Int. Cl.
*F16F 7/10* (2006.01)
*F16F 1/37* (2006.01)
(Continued)

(52) U.S. Cl.
CPC .......... *F16F 7/108* (2013.01); *F16F 2222/08* (2013.01); *F16F 2226/04* (2013.01); *F16F 2228/08* (2013.01); *F16F 2230/0005* (2013.01)

(58) Field of Classification Search
CPC ...... F16F 7/108; F16F 222/08; F16F 2226/04; F16F 2228/08; F16F 2230/0005; F16F 1/3735; F16F 15/08
See application file for complete search history.

(56) References Cited

U.S. PATENT DOCUMENTS 2,661,969 A * 12/1953 Thiry ........................ F16F 1/38
403/228
2,951,674 A * 9/1960 Rice ...................... F16F 1/3732
411/510

(Continued)

FOREIGN PATENT DOCUMENTS

| CN | 104074908 A | 10/2014 |
|---|---|---|
| CN | 106969074 B | 3/2019 |

(Continued)

OTHER PUBLICATIONS

International Search Report, PCT/EP2020/071442, dated Nov. 9, 2020.

(Continued)

*Primary Examiner* — Robert A. Siconolfi
*Assistant Examiner* — James K Hsiao
(74) *Attorney, Agent, or Firm* — Fishman Stewart PLLC

(57) ABSTRACT

A damping device for absorbing and/or damping vibrations of a vehicle part or isolating and/or damping a vibrating vehicle component includes a mass element, a fastening element for fastening the damping device to a vehicle part, and a spring device connecting the mass element to the fastening element to be capable of oscillation. The mass element or fastening element having a fastening device for fastening the spring device. The mass element and/or vehicle part comprises a supporting devices for supporting the spring device, wherein the spring device comprises a fastening device fixed to the fastening means and at least two supporting portions supported in opposite axial direction on (Continued)

the supporting device. The fastening device and supporting device are spaced apart in axial direction such that when supporting sections bear against the supporting device, the spring device is preloaded. The invention relates to a method of assembling a damping device.

16 Claims, 6 Drawing Sheets

(51) Int. Cl.
  *F16F 7/108* (2006.01)
  *F16F 15/08* (2006.01)

(56) References Cited

U.S. PATENT DOCUMENTS

| | | | | |
|---|---|---|---|---|
| 3,319,918 A * | 5/1967 | Rapata | F16B 37/043 | 267/141 |
| 4,405,272 A * | 9/1983 | Wollar | F16B 19/1081 | 411/41 |
| 4,442,367 A * | 4/1984 | Suzuki | F16F 1/373 | 310/91 |
| 5,046,566 A * | 9/1991 | Dorner | F16F 1/3732 | 30/381 |
| 5,397,206 A * | 3/1995 | Sihon | F16F 7/00 | 411/970 |
| 5,570,867 A * | 11/1996 | Norkus | B62D 33/0604 | 248/609 |
| 5,599,148 A * | 2/1997 | Hirose | F16B 37/0842 | 411/338 |
| 5,699,865 A * | 12/1997 | Forderer | B27B 17/0033 | 267/269 |
| 6,354,578 B1 * | 3/2002 | Nakatsukasa | F16F 1/3735 | 267/293 |
| 6,572,127 B2 * | 6/2003 | Pazdirek | B60G 11/12 | 280/124.152 |
| 6,666,438 B2 * | 12/2003 | Nakagawa | F16F 1/3814 | 267/141.2 |
| 6,767,020 B2 * | 7/2004 | Yamamoto | A61P 15/00 | 280/124.109 |
| 6,893,196 B2 * | 5/2005 | Wille | F16B 19/1072 | 411/969 |
| 7,246,797 B2 * | 7/2007 | Gustavsson | F16F 7/108 | 267/269 |
| 7,389,977 B1 * | 6/2008 | Fernandez | F16F 3/087 | 267/293 |
| 8,864,116 B2 * | 10/2014 | Jung | F02M 35/161 | 267/293 |
| 8,950,736 B2 * | 2/2015 | Gustavsson | F16F 7/108 | 267/141 |
| 9,291,228 B2 | 3/2016 | Goetz | | |
| 9,303,679 B2 * | 4/2016 | Dechant | F16B 37/0842 | |
| 9,366,311 B2 * | 6/2016 | Gustavsson | F16F 15/08 | |
| 9,689,454 B2 | 6/2017 | Gustavsson | | |
| 9,702,423 B2 | 7/2017 | Gustavsson | | |
| 10,006,514 B2 | 6/2018 | Gustavsson | | |
| RE47,687 E * | 11/2019 | Umemura | B62D 7/222 | |
| 10,960,931 B2 * | 3/2021 | Vandermeer | B62D 25/084 | |
| 11,149,768 B2 * | 10/2021 | Clark | F16B 5/0241 | |
| 11,447,177 B2 | 9/2022 | Myklebust | | |
| 11,685,435 B2 * | 6/2023 | Myklebust | B60R 21/2037 | 280/731 |
| 11,859,684 B2 * | 1/2024 | Neidhardt | F16F 1/3732 | |
| 2002/0125698 A1 * | 9/2002 | Schutz | B62D 1/04 | 280/731 |
| 2004/0040809 A1 * | 3/2004 | Gustavsson | F16F 1/3713 | 267/136 |
| 2006/0202400 A1 * | 9/2006 | Fitzgerald | F16F 3/0876 | 267/293 |
| 2006/0226622 A1 * | 10/2006 | Trotter | F16F 1/3735 | 267/276 |
| 2007/0071578 A1 * | 3/2007 | Shinozaki | F16B 21/186 | 411/508 |
| 2008/0143029 A1 * | 6/2008 | Sato | F16F 1/38 | 267/141.1 |
| 2009/0278292 A1 * | 11/2009 | Retat | F16F 15/046 | 267/140.2 |
| 2011/0057367 A1 | 3/2011 | Hasegawa | | |
| 2011/0095458 A1 * | 4/2011 | Schmitz | F16F 13/14 | 267/140.12 |
| 2012/0298392 A1 * | 11/2012 | Weiss | F16F 7/10 | 173/162.1 |
| 2012/0306119 A1 * | 12/2012 | Boes | F16F 1/3842 | 188/380 |
| 2012/0326369 A1 * | 12/2012 | Kawachi | B60K 15/067 | 267/141.4 |
| 2013/0241125 A1 | 9/2013 | Helferich | | |
| 2016/0017949 A1 * | 1/2016 | Kobus | F16F 7/108 | 188/380 |
| 2016/0031480 A1 * | 2/2016 | Ishii | B60Q 5/003 | 280/731 |
| 2016/0169314 A1 * | 6/2016 | Choi | F16F 7/108 | 188/380 |
| 2016/0281813 A1 | 9/2016 | Gustavsson | | |
| 2017/0100977 A1 | 4/2017 | Drabon | | |
| 2019/0186577 A1 | 6/2019 | Back et al. | | |
| 2019/0344831 A1 * | 11/2019 | Asai | F16F 3/0873 | |
| 2020/0271182 A1 * | 8/2020 | Hugenschmidt | F16F 1/3735 | |
| 2020/0309226 A1 * | 10/2020 | Dürre | F16F 7/108 | |
| 2020/0325921 A1 * | 10/2020 | Brewer | F16B 5/0241 | |
| 2020/0339192 A1 * | 10/2020 | Myklebust | F16F 3/0873 | |
| 2022/0112936 A1 * | 4/2022 | Rose | F16F 15/08 | |
| 2022/0403903 A1 * | 12/2022 | Myklebust | F16F 7/108 | |

FOREIGN PATENT DOCUMENTS

| | | |
|---|---|---|
| DE | 19741535 A1 | 3/1999 |
| DE | 102016115782 A1 | 3/2018 |
| DE | 102019104386 A1 | 8/2020 |
| EP | 2112399 B1 | 7/2011 |
| EP | 3524846 A1 | 8/2019 |
| JP | H1030678 A | 2/1998 |
| WO | 01/92752 A1 | 12/2001 |
| WO | 2019129512 A1 | 7/2019 |

OTHER PUBLICATIONS

German office action, DE 10 2019 125 701.8, dated May 6, 2020 with google machine translation.

Chinese Office Action and Search Report, CN 202080062548.2, dated Jun. 17, 2024 (w_translation).

* cited by examiner

DAMPING APPARATUS AND METHOD FOR ASSEMBLY

CROSS-REFERENCE TO RELATED APPLICATIONS

This application is a National Stage Patent Application of International Patent Application No. PCT/EP2020/071442, filed Jul. 29, 2020, which claims the benefit of German Application Serial No. 10 2019 125 701.8, filed Sep. 24, 2019, the contents of each are incorporated by reference in their entireties.

TECHNICAL FIELD

The invention relates to a damping device or apparatus for absorbing and/or damping vibrations of a vehicle part or a vibrating vehicle component, comprising at least one mass element, at least one fastening element for fastening the damping device to the vehicle part or a vehicle part adjacent to the mass element, and at least one spring device which connects the mass element to the fastening element in a manner capable of vibrating. Furthermore, the invention relates to a method for mounting such a damping device or apparatus.

BACKGROUND

Damping devices of the type mentioned above are used in motor vehicle construction to reduce the vibration transmitted from the engine to a vehicle part, such as a transmission, while the vehicle is moving or stationary, and thus to increase ride comfort. Known damping devices have a spring device formed from rubber and a mass element, the mass element being coupled via the spring device to the vehicle part to be damped so that it can vibrate. If the vehicle part connected to the damping device starts to vibrate, the mass element vibrates with a 90° phase offset and elevation, with damping of the vibration taking place via the spring device.

WO 01/92752 A1, U.S. Pat. No. 10,006,514 B2, U.S. Pat. No. 9,702,423 B2 and CN 106969074 B show vibration absorbers with an absorber mass, a fastening element and a spring device in the form of a rubber body. For fastening the spring device to the absorber mass and the fastening element, the spring device has two circumferential receiving grooves which positively engage around corresponding projections of the absorber mass and the fastening element.

SUMMARY

The present invention is based on the task of creating a damping device and a method for assembling a damping device, which enable improved and at the same time cost-effective manufacture and assembly.

To solve the problem, a damping device having the features as disclosed herein and a method for assembling the damping device having features such as disclosed herein are proposed.

Beneficial designs of the damping device are the subject of the dependent claims.

A damping device for absorbing and/or damping vibrations of a vehicle part or for isolating and/or damping a vibrating vehicle component, comprising at least one mass element, at least one fastening element for fastening the damping device to the vehicle part or to a vehicle part adjacent to the mass element, and at least one spring device which connects the mass element to the fastening element in a manner capable of vibrating, the mass element or the fastening element having at least one fastening device for fastening the spring device, and the fastening element having at least two support sections which are fixed to the fastening device and which support the spring device, characterized in that the mass element and/or the vehicle part comprises at least two supporting means for supporting the spring device, wherein the spring device comprises at least one fastening device fixed to the fastening means and at least two supporting sections which are supported in opposite axial directions on the supporting means, wherein the fastening means and the supporting means are spaced apart in the axial direction in such a way that the spring device is preloaded when the supporting sections abut the supporting means.

The axial direction corresponds to the longitudinal direction of the damping device. The radial direction is understood to be the direction transverse to the axial direction. Opposite axial direction means that the two support sections point in opposite axial directions, i.e. a first support section points in a first axial direction and a second support section points in a second axial direction.

The damping device can be used to absorb and/or damp a vehicle part, such as a transmission, a tailgate or a chassis. If the damping device is used for eradication and/or damping of a vehicle part, such as a transmission, a tailgate or a chassis, then the damping device may also be referred to as a vibration absorber. The damping device may also be used to isolate and/or damp a vehicle component, such as a pump, compressor, control element, or power unit. When the damping device is used to isolate and/or damp a vehicle component, the vehicle component forms the ground element of the damping device and the fastening element is fixed to a vehicle part adjacent to the vehicle component. If the damping device is used to isolate and/or damp a vehicle component, then the damping device can also be referred to as a decoupling device.

Due to the constructive pretension between the spring device, the mass element, the fastening element and/or the vehicle part, the connection on at least one connection side is only possible by support, so that at least one of the support sections can only be placed on one of the support surfaces. In addition, both support sections are pressed against the support surfaces on both sides as a result of the contact pressure due to the design pretension, so that a form fit on both sides is produced from the pure support, which secures the spring device to the mass element or to the fastening element. Thus, it is not necessary to connect the spring device to the mass element, the fastening element and/or the vehicle part by means of a material bond. This makes the damping device simple and cost effective to manufacture.

To generate the pretension, the fastening device is advantageously first positively connected to the fastening device and then the spring device is compressed so that the support sections can be placed on the support devices. Further advantageously, to generate the pretension, the fastening device is positively connected to the fastening means, and for final fixing, the spring device is pressed over by means of the fastening element and/or the mass element and thereby pretensioned by bringing a first support section into contact with a first support surface of the mass element or the fastening element and bringing a second support section into contact with a second support surface of the mass element or the fastening element. Furthermore, for final fixing, the first support section and/or the second support section can be in contact with a screw-on surface of the vehicle part, in which case the damping device is screwed to the vehicle part in order to introduce a prestress, thereby compressing and prestressing the spring device.

In a beneficial configuration, the mass element is made of metal. Further advantageously, the mass element can be cylindrical or polygonal. Further advantageously, the mass element can be a pump, a compressor, a control element or a power unit of a vehicle.

In a beneficial configuration, the grounding element has an opening. In a beneficial configuration, the opening extends from the first end of the ground element to a second end of the ground element.

Further advantageously, the opening extends from a first end of the spring device to a second end of the spring device. In a beneficial configuration, a projection projects radially into the opening from an inner wall of the opening. Advantageously, the two projections are each adjoined by a trapezoidal recess into which a projection of the spring device projects. In a beneficial configuration, a semicircular recess is arranged between the two trapezoidal recesses, against which an outer wall of the spring device can rest and limit the radial deflection of the mass element.

In a beneficial configuration, the fastening element is in the form of a sleeve or a cuboid container with a base and side walls surrounding the base. The fastening element can be made of metal or plastic, in particular fiber-reinforced plastic. In a beneficial configuration, the fastening element has a through-hole. The through hole is used to fasten the damping device to an adjacent vehicle part, such as a transmission, a tailgate or a chassis. Furthermore, the fastening element can have a blind hole for fastening to an adjacent vehicle part, or the fastening element is designed as a bolt, which can be provided at the end with an edge running around in some areas, which serves as a contact surface against the vehicle part to be fastened.

In a beneficial configuration, the spring device has one or more rubber springs, one or more metal springs or one or more plastic springs. The spring device is also advantageously designed as a hollow body.

In a beneficial configuration, the fastening device is formed integrally and materially from the fastening element or the mass element. Furthermore, the fastening device can be a separate part that can be connected to the fastening element or the mass element by a form-fit and/or material-fit.

In a beneficial configuration, the fastening device is formed in one piece and materially uniform from the fastening element, the mass element and/or the vehicle part. Furthermore, the support device can be a separate part that can be connected to the fastening element, the mass element and/or the vehicle part in a form-fit and/or material-fit manner.

In a beneficial configuration, a first support section is located on a first support device of the mass element, the fastening element or the vehicle part and a second support section is located on a second support device of the mass element, the fastening element or the vehicle part. In a beneficial configuration, the support sections are spaced apart from each other. In a beneficial configuration, the support sections are radially and axially spaced from the fastening device. The support devices advantageously each have a support surface on which the support sections rest.

Beneficially, the fastening device engages positively around the fastening device. Furthermore, the fastening device is advantageously formed from one or two fastening sections formed on the spring device.

In a beneficial configuration, the spring device has a length between the fastening device and a support section in the unmounted state that is greater than a distance between the fastening device and a support device. As a result, the spring device is compressed and preloaded when in contact with the support devices, so that the spring device exerts a contact pressure on the support devices to hold the mass element or the fastening element between the support sections in a form-fitting and force-fitting manner.

In a beneficial configuration, the support sections generate an axial overlap when in contact with the support devices. This exerts a uniform contact pressure on the support devices.

In a beneficial configuration, support sections are spaced apart in the axial direction A. In this way, the support sections can form a receiving groove for form-fit and force-fit reception of a section of the mass element or the fastening element.

In a beneficial configuration, the fastening device is positively and non-positively fixed to the fastening device. This creates a simple and cost-effective fastening. In a beneficial configuration, the form-fit connection between the fastening device and the fastening equipment is made by clipping.

In a beneficial configuration, the fastening device has at least one circumferential groove, and the fastening device has at least one projection corresponding to the circumferential groove. This creates a simple and inexpensive form-fitting and force-fitting connection between the spring device and the ground element or the fastening element. Further advantageously, the fastening device has at least one circumferential groove, and the fastening device has at least one projection corresponding to the circumferential groove. In a beneficial configuration, the projection projects radially into the opening from an inner wall of the opening of the mass element.

In a beneficial configuration, the groove and/or protrusion may be created during the manufacture of the spring device and the mass element or the fastening element. For example, the protrusion may be created during cold extrusion, casting or turning of the mass element or fastener. Furthermore, the protrusion may also be realized by an additional element which may be connected to the mass element or the fastening element. The additional element can be a press-on ring or can be produced by plastic overmolding.

In a beneficial configuration, the support devices are formed as at least one shoulder or recess projecting from the ground element or the fastening element. In this way, the support surfaces can be formed in a simple and cost-effective manner during the manufacture of the ground element itself or can be realized by an additional element which is connected to the ground element or the fastening element. For example, the shoulder or the recess can be created during cold extrusion, casting or turning of the mass element or the fastening element. Furthermore, the step can also be realized by an additional element which can be connected to the mass element or the fastening element. The additional element may be a press-on ring or may be created by plastic overmolding. In a beneficial configuration, the recess is a blind hole.

In a beneficial configuration, at least one projection and at least one step have an overlap in the radial direction to form an anti-loss device. In the event of damage to the spring device, the anti-loss device prevents the ground element from detaching from the damping device and thereby causing damage to the vehicle. In addition, in the event of an accident, the loss prevention device absorbs the loads that occur in the process. Advantageously, an outer diameter of the protrusion is greater than or equal to an inner diameter of the protruding shoulder to create a radial overlap. Further beneficial is an inner diameter of the projection smaller than or equal to an outer diameter of the protruding shoulder. Furthermore, even without complete overlap of at least one protrusion and at least one shoulder in the radial direction, the forces of the anti-loss device due to deformation of the spring device with blockage of a gap formed between the components can be very high and sufficient to act as an anti-loss device.

In a beneficial configuration, at least one pin element projects from the ground element and extends through a hole edge introduced into the fastening element, the pin element and the hole edge having an overlap in the radial direction in order to form a loss prevention device, in particular a loss prevention device in the radial direction. In a beneficial configuration, pin elements project from the ground element and extend through hole edges introduced into the fastening element, the pin elements and the hole edges having an overlap in the radial direction in order to form a loss prevention device, in particular a loss prevention device in the radial direction.

In a beneficial configuration, the spring device has at least one axial stop and/or at least one radial stop which interacts with the fastening element and/or the mass element in order to limit a deflection of the mass element relative to the fastening element. Beneficially at least one axial stop is formed as a bead which rests on an upper side or an underside of the mass element and cooperates with a collar formed on the fastening element. In a beneficial configuration, the spring device has two axial stops, a first axial stop resting on an upper side of the mass element and a second axial stop resting on an underside of the mass element and interacting with collars formed on the fastening element and/or a vehicle part. In a beneficial configuration, the axial stop is arranged immediately adjacent to the fastening section. In a beneficial configuration, an inner contour and/or outer contour of the spring element forms the at least one radial stop. Further beneficially, the radial stop interacts with the fastening element or the mass element, in particular a recess of the mass element.

In a beneficial configuration, the spring device has an additional radial track on its outer side and/or inner side. Advantageously, the radial track acts parallel to the spring sections and influences the frequency spread between radial and axial. As a result, a frequency spread between radial and axial can be adjusted by the stiffness section between the spring device and the second radial stop designed as an additional spring. In a beneficial configuration, the radial track is a radial rubber track. In a beneficial configuration, the radial track is in contact with the fastening element and/or the ground element. Preferably, as a result of the radial track, the damping device is hard in the radial direction and soft in the axial direction. In a beneficial configuration, the radial track is formed as an elevation projecting radially from the spring device, which surrounds the spring device in sections or completely.

In a beneficial configuration, the spring device is inserted into an opening of the mass element or of the fastening element, and at least one section of the mass element or of the fastening element is inserted into a through opening of the spring device. To generate the pretension, the spring device is first inserted into an opening of the mass element or the fastening element in such a way that the fastening device is positively connected to the fastening device. Subsequently, for final fixing, at least a section of the mass element or the fastening element is inserted into the through opening of the spring device in such a way that the spring device is pressed over and pretensioned, in that a first support section is supported on a first support surface of the mass element or of the fastening element and a second support section is supported on a second support surface of the mass element or of the fastening element, or the final fixing is effected in that the second support section bears against a vehicle part and the spring device is prestressed by mounting the damping device on the vehicle.

In a beneficial configuration, the support sections and the support devices have a surface inclined to the longitudinal axis of the damping device or a surface perpendicular to the longitudinal axis of the damping device. This allows the spring device to exert sufficient contact pressure on the support sections to securely connect the mass element and the attachment element.

In a beneficial configuration, the fastening device and each of the support sections are connected to each other via a spring section which is inclined to the longitudinal axis of the damping device. Due to the inclined position of the spring section, the contact pressure resulting from the pretensioning can be easily transmitted to the supporting devices which are radially and axially spaced from the fastening device. Further advantageously, the fastening device is formed by two fastening sections, each of the fastening sections being connected to one of the supporting sections via a spring section. Furthermore, the fastening device may be formed of one fastening section, wherein each of the support sections is connected to the fastening section via a spring section. In a beneficial configuration, the spring device comprises a first spring section and a second spring section which are inclined with respect to a longitudinal axis of the damping device. Preferably, the first spring section and the second spring section are opposite each other in the axial direction. In a beneficial configuration, the spring device can also have only one spring section that is set obliquely with respect to a longitudinal axis of the damping device.

In a beneficial configuration, the spring device comprises at least one area-wise sleeve-shaped rubber body, an area-wise sleeve-shaped plastic body or an area-wise sleeve-shaped metal body. In a beneficial configuration, the spring device comprises two sleeve-shaped rubber bodies. In a beneficial configuration, the spring sections are formed as rubber tracks that are set at an angle with respect to a longitudinal axis of the damping device. When the spring device is formed from a single sleeve-shaped rubber body, the rubber body has a supporting section forming the mounting device, two spring sections and two support sections. When the spring device is formed of two rubber bodies, each rubber body has a fastening section, a spring section and a support surface. In a beneficial configuration, the rubber body is L-shaped, C-shaped or S-shaped in cross-section. If the spring device is formed from two sleeve-shaped rubber bodies, then in a beneficial configuration the two rubber bodies form a receiving groove in the assembled state, into which the supporting device can be inserted, in particular pressed in. If the fastening device is designed as a container within which the mass element is arranged so as to be capable of oscillation, then in a beneficial configuration the spring device comprises four sleeve-shaped rubber bodies, each rubber body having a fastening section, a spring section and a supporting surface. In the case of four rubber bodies, each groove of a fastening section engages positively around a hole edge.

Furthermore, a method for mounting a damping device with at least one mass element, at least one fastening element for fastening the damping device to a vehicle part and at least one spring device which connects the mass element to the fastening element in a manner capable of oscillation is proposed, which comprises the following method steps. First, at least one spring device is inserted into an opening in the mass element or the fastening element, so that a fastening device of the spring device engages positively around a fastening device of the mass element or the fastening element. Thereafter, at least a section of the fastening element or the mass element is pressed into a through opening of the spring device until a first support section of the spring device abuts against a first support surface of the mass element or the fastening element and a second support section of the spring device abuts against a second support surface of the mass element or the fastening element, or at least a section of the fastening element or of the mass element is inserted into a through opening of the spring device until a first support section of the spring device abuts against a support surface of the mass element or of the fastening element and a second support section of the spring device abuts against a second support surface of the vehicle part, wherein, in order to introduce a prestress into the spring device, the damping device is fastened to the vehicle part or to a vehicle part adjacent thereto.

BRIEF DESCRIPTION OF THE DRAWINGS

The following, damping devices, methods for mounting the damping devices as well as further features and advantages are explained in more detail on the basis of configuration examples, which are shown schematically in the figures.

DETAILED DESCRIPTION

Figure 1:
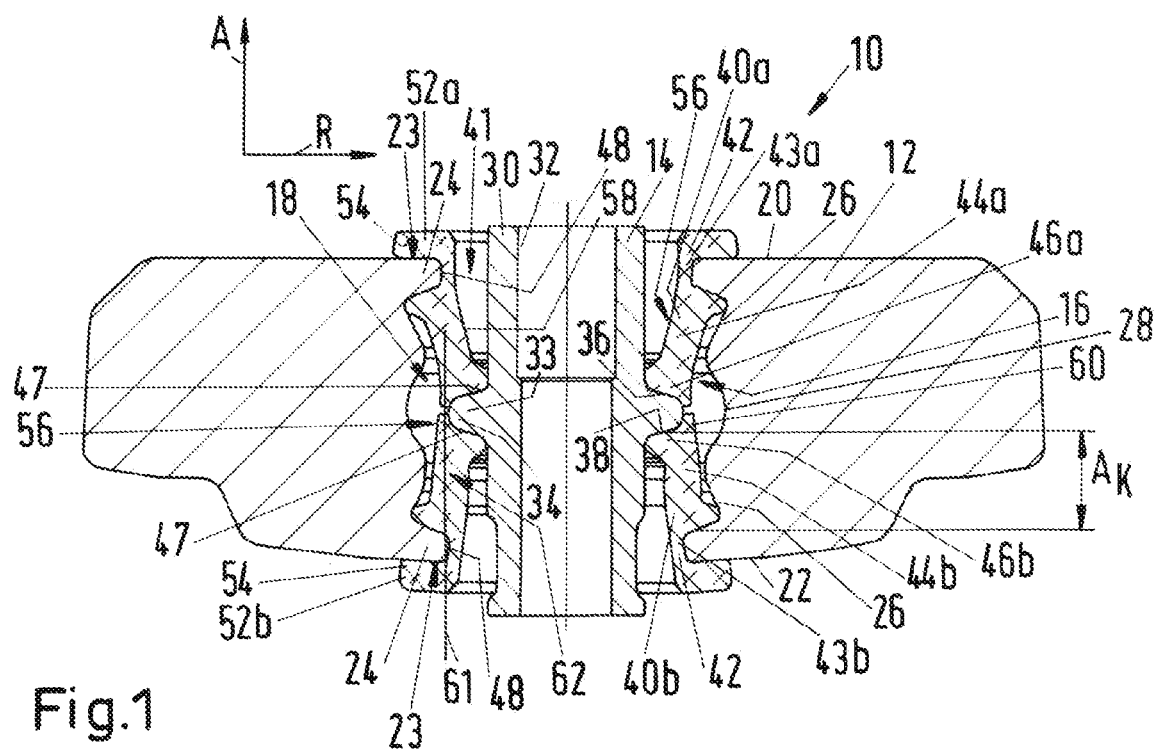
FIG. 1 generally illustrates a cross-sectional view of a damping device according to a first configuration.
Figure 2:
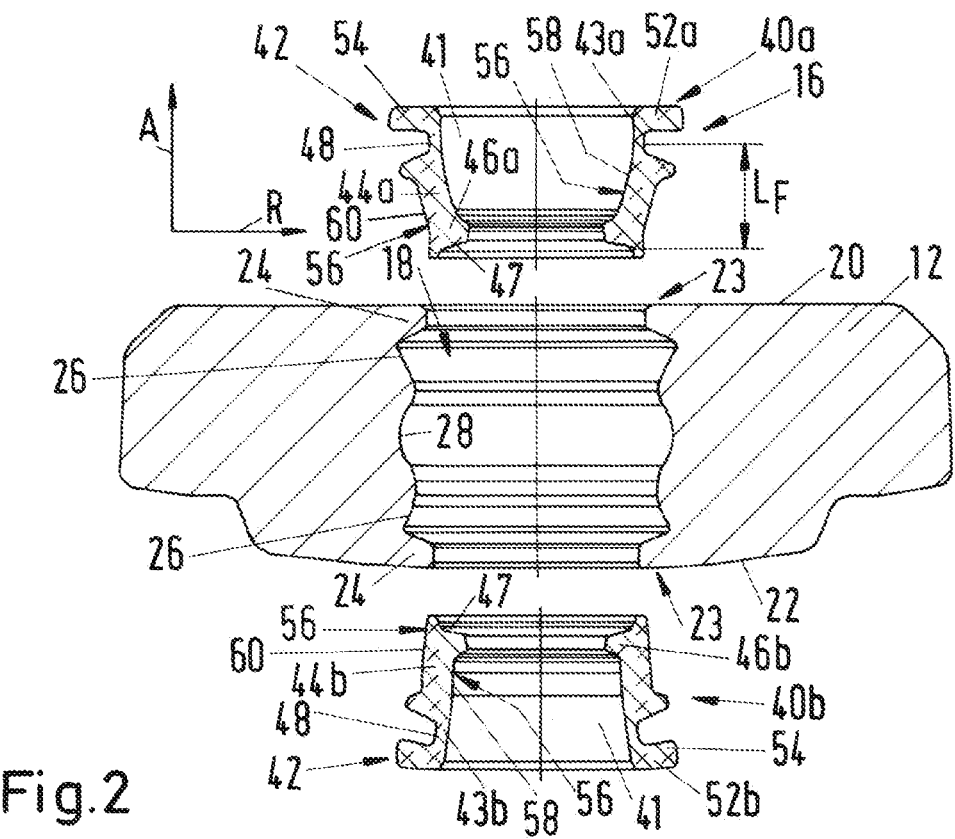
FIG. 2 generally illustrates a cross-sectional view of a mass element and a spring device prior to insertion into the mass element according to the first configuration.
Figure 3:
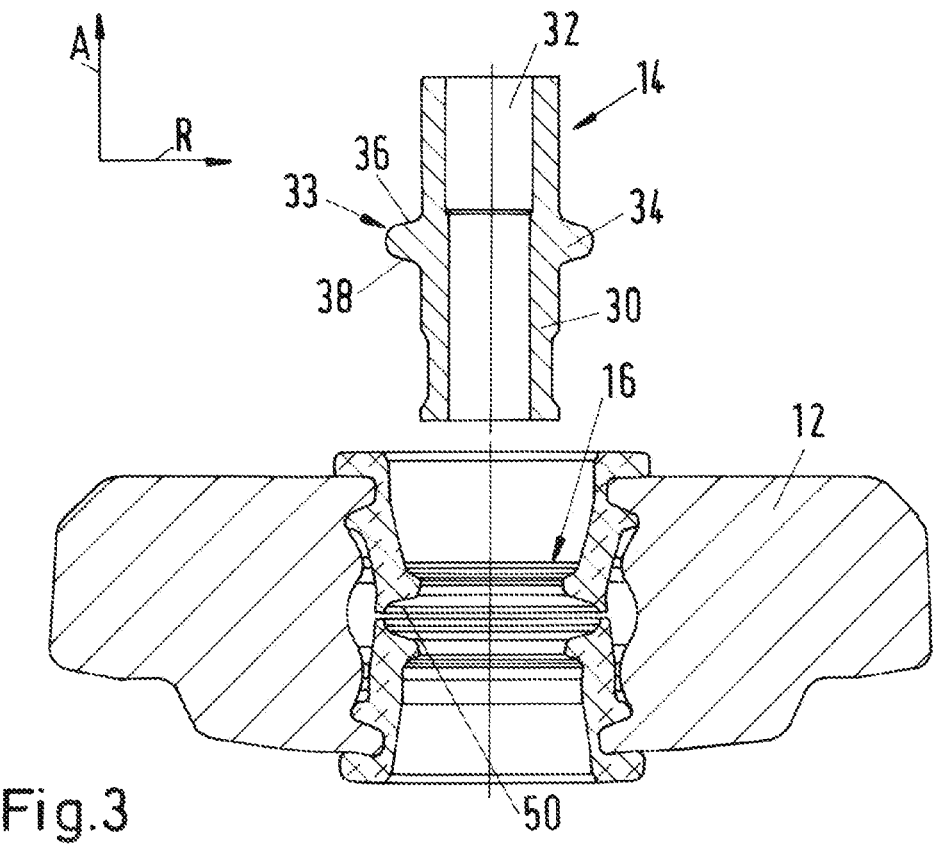
FIG. 3 generally illustrates a cross-sectional view of the mass element and the spring device inserted into the mass element and of a fastening element before insertion into the spring device according to the first configuration.

FIGS. 1 to 3 show a damping device (or damping apparatus) 10 according to a first configuration, which serves to absorb and/or damp vibrations of a vehicle part not shown.

The damping device 10 has a mass element 12, a fastening element 14 for fastening the damping device 10 to the vehicle part not shown, and at least one spring device 16 which connects the ground element 12 to the fastening element 14 in a manner capable of oscillation.

The mass element 12 is made of metal and in the present case has an approximately cylindrical shape. As can be seen in particular in FIG. 2, the mass element 12 has an opening 18 which extends from a first end 20 of the mass element 12 to a second end 22 of the mass element 12.

The mass element 12 also has a fastening device 23 which is formed from two projections protruding into the opening 18 in the region of the ends 20, 22. Each of the two projections 24 is adjoined by a trapezoidal recess 26, between which a semicircular recess 28 is arranged.

The fastening element 14 is designed as a sleeve 30 made of metal or plastic, in particular a fiber-reinforced plastic. The sleeve 30 has a central through-hole 32 through which a fastening element (not shown) can be passed in order to connect the damping device 10 to a motor vehicle part (not shown).

As can be seen in FIGS. 1 and 2, sleeve 30 has a support device 33 approximately in the center, which is formed as a circumferential shoulder 34. The shoulder 34 has a first support surface 36 on the surface facing the first end 20 and a second support surface 38 on the surface facing the second end 22.

The spring device 16 is formed of two sleeve-shaped rubber bodies 40 a, 40 b. Each of the rubber bodies 40 a, 40 b has a through hole 41, a fastening means 42, a support section 46 a, 46 b, and a spring section 44 a, 44 b connecting the fastening means 42 and the support section 46 a, 46 b.

The fastening means 42 has a fastening section 43 a, 43 b that includes a circumferential groove 48 formed in the rubber body 40 a, 40 b.

The spring sections 44a, 44b are inclined with respect to a longitudinal axis L of the damping device 10, so that the spring sections 44 form tapered sleeve sections. The axial stiffness of the damping device 10, i.e. the stiffness in axial direction A, is set via the spring sections.

As shown in FIG. 3, in the assembled state the support sections 46a, 46b point in opposite axial directions A and face each other to form a receiving groove 50 for the shoulder 34 of the fastener 14. In the assembled state, an abutment surface 47 of the first support section 46a abuts the first support surface 36 and an abutment surface 47 of the second support section 46b abuts the second support surface 36.

Since the rubber bodies 40a, 40b have a length LF between the fastening section 43a, 43b and the support section 46a, 46b in the unmounted state which is greater than a distance AK between the fastening device 23, in particular the projections 24, and the support devices 33, in particular the shoulder 34, the rubber bodies 40a, 40b are compressed and thereby pretensioned when they rest against the support surfaces 36, 38. Due to the prestressing, the rubber bodies 40a, 40b exert a contact pressure on the support surfaces 36, 38, which fixes the fastening element 14 between the support sections 46a, 46b in a form-fitting and force-fitting manner.

Further, each of the rubber bodies 40a, 40b has an axial stop 52a, 52b formed as a bead 54. As can be seen in FIG. 1, a first axial stop 52a is arranged on the upper side or on the first end 20 of the mass element 12 and a second axial stop 52b is arranged on the lower side or on the second end 22 of the mass element 12. The axial stops 52a, 52b cooperate either with not shown collars of the sleeve 30 and/or with a not shown vehicle part in order to limit a deflection of the mass element 12 in axial direction A.

In addition, the rubber bodies 40a, 40b have a radial stop 56 which limits a deflection of the mass element 12 relative to the fastening element 14 in the radial direction R. Presently, the radial stop 56 is formed by an inner side 58 and an outer side 60 of the rubber bodies 40a, 40b. To limit deflection in the radial direction R, the inner side 58 rests against the sleeve 30 and the outer side 60 comes into contact with the inner wall of the opening 18 in the region of the semicircular recess 28.

As can also be seen in FIG. 1, the shoulder 34 and the projection 24 at the second end 22 form an overlap in the radial direction R. This overlap forms a loss prevention device 62 which prevents the ground element 12 from falling off in the event of damage to the rubber bodies 40a, 40b and absorbs the loads arising in the event of an accident.

In the following, a possible method for assembling the damping device 10 shown in FIGS. 1 to 3 is described. For this purpose, as can be seen in FIG. 2, the rubber bodies 40a, 40b are inserted into the opening 18 so that the grooves 48 engage positively around the projections 24 and the supporting surfaces 36, 38 face each other and form the receiving groove 50. The sleeve 30 is then inserted into the rubber bodies 40a, 40b by pressing the shoulder 34 into the receiving groove 50. Since the rubber bodies 40a, 40b have a length LF between the fastening section 43a, 43b and the supporting section 46a, 46b in the non-mounted state which is greater than a distance AK between the fixing device 23 and the supporting devices 33, the two rubber bodies 40a, 40b are compressed so that the supporting sectiongs 46a, 46b abut the supporting surfaces 36, 38 with pretension. Due to the pretension, the spring device 16 is fixed interlocking and frictionally to the ground element 12 and the fastening element 14.

In the following, further configurations of the damping device 10 are described, whereby the same reference signs are used for identical or functionally identical parts.

Figure 4:
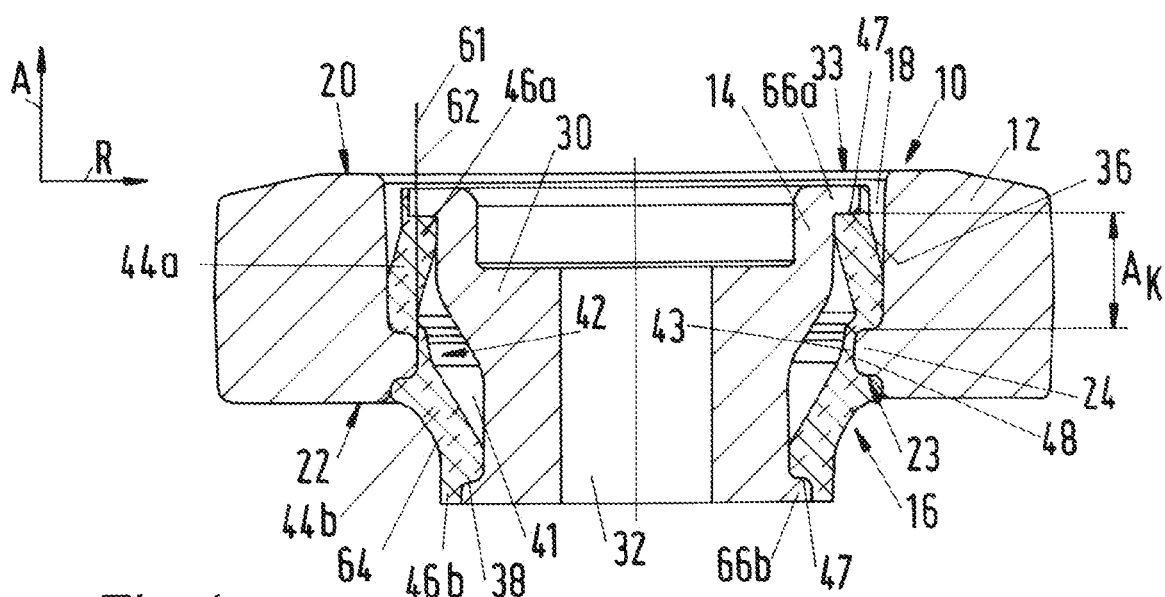
FIG. 4 generally illustrates a cross-sectional view of a damping device according to a second configuration.
Figure 5:
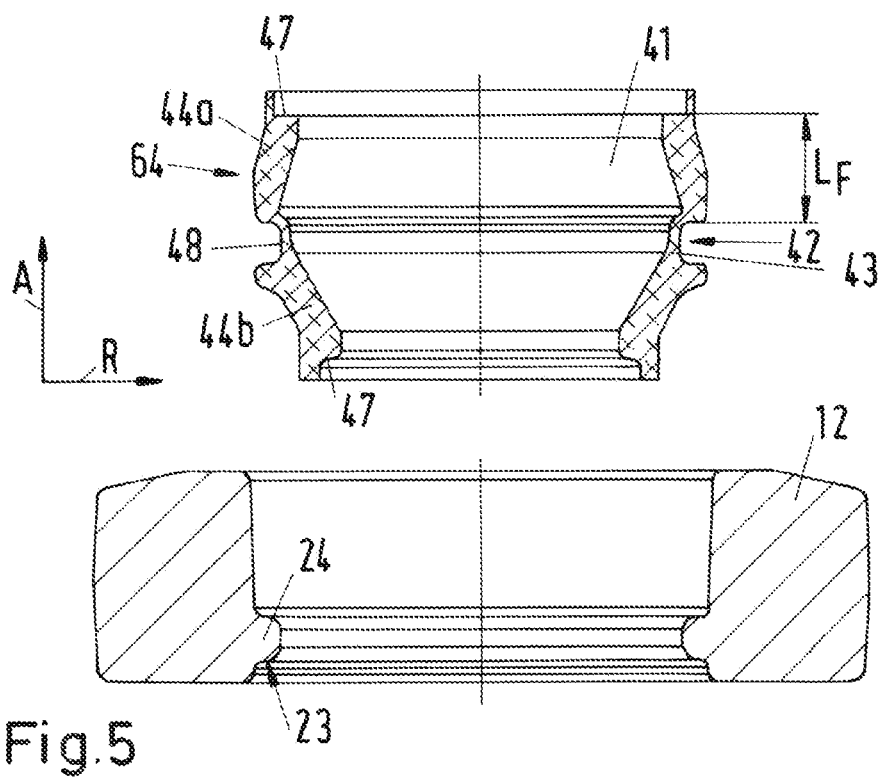
FIG. 5 generally illustrates a cross-sectional view of a mass element and a spring device prior to insertion into the mass element according to the second configuration.
Figure 6:
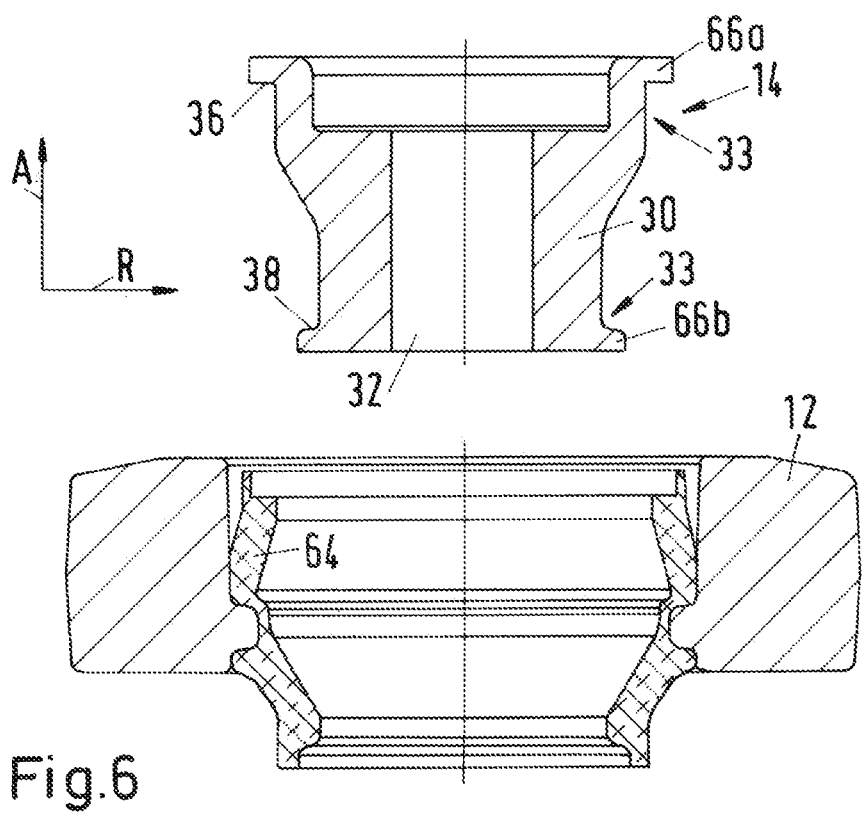
FIG. 6 generally illustrates a cross-sectional view of the mass element and the spring device inserted therein and a fastening element before insertion into the spring device according to the second configuration.

FIGS. 4 to 6 show a second configuration of the damping device 10, which differs from the first configuration in that the spring device 16 is formed from a single sleeve-shaped rubber body 64.

As shown in FIG. 5, the fastening means 42 is formed by a fastening section 43, which is arranged centrally and has the groove 48 for engaging around the fastening device 23 in a form-fitting manner. A respective spring section 44 a, 44 b projects from the fastening section 43 and is inclined with respect to the longitudinal axis L of the damping device 10. Adjacent to the spring sections 44 are the support sections 46 a, 46 b.

Furthermore, as can be seen in FIGS. 4 to 5, compared to the first configuration, the ground element 12 has an approximately cylindrical opening 18 with only one projection 24 as a fastening device 23.

In addition, the fastening element 14 formed as a sleeve 30 differs from the first configuration in that the latter is provided at each end with a circumferential collar 66a, 66b, which form the support surfaces 36, 38.

In the configuration shown in FIGS. 4 to 6, a length LF of the rubber body 64 between the fastening section 43 and the supporting sections 46a, 46b is greater than a distance AK between the fastening device 23 and the collars 66a, 66b in the non-mounted state. As a result, the rubber body 64 is compressed and prestressed when it rests against the collars 66a, 66b and thus exerts a contact pressure on the collars 66a, 66b, which fixes the fastening element 14 between the support sections 46a, 46b in a form-fitting and force-fitting manner.

To assemble the damping device 10 shown in FIGS. 4 to 6, the rubber body 64 is first inserted into the opening 18 of the ground element 12 in such a way that the groove 48 engages positively around the projection 24. Subsequently, the sleeve 30 is inserted into the rubber body 64, in particular pressed in, until the first collar 66a rests against the first support surface 36 and the second collar 66b rests against the second support surface 38. As a result, the rubber body 64 is prestressed and the support surfaces 36, 38 exert a contact pressure on the collars 66a, 66b.

Figure 7:
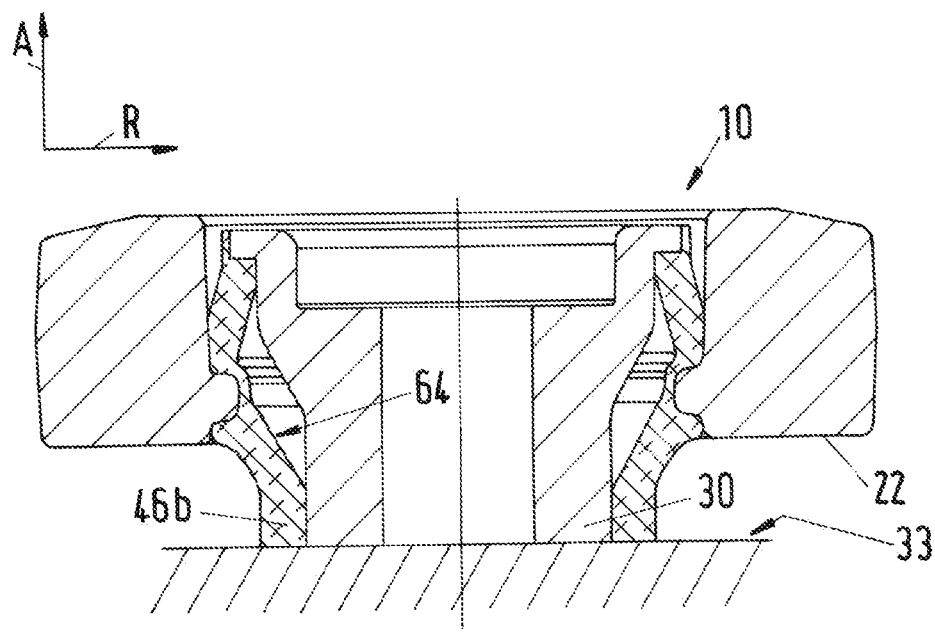
FIG. 7 generally illustrates a cross-sectional view of a damping device according to a third configuration.

In FIG. 7, a third configuration of the damping device 10 is shown, which differs from the second configuration in that the sleeve 30 does not comprise a collar at its end facing the second end 22, so that the second support section 46b comes into contact with the vehicle part when the damping device 10 is mounted with a vehicle part not shown, and the rubber body 64 is thereby compressed and sheared with pretension.

Figure 8:
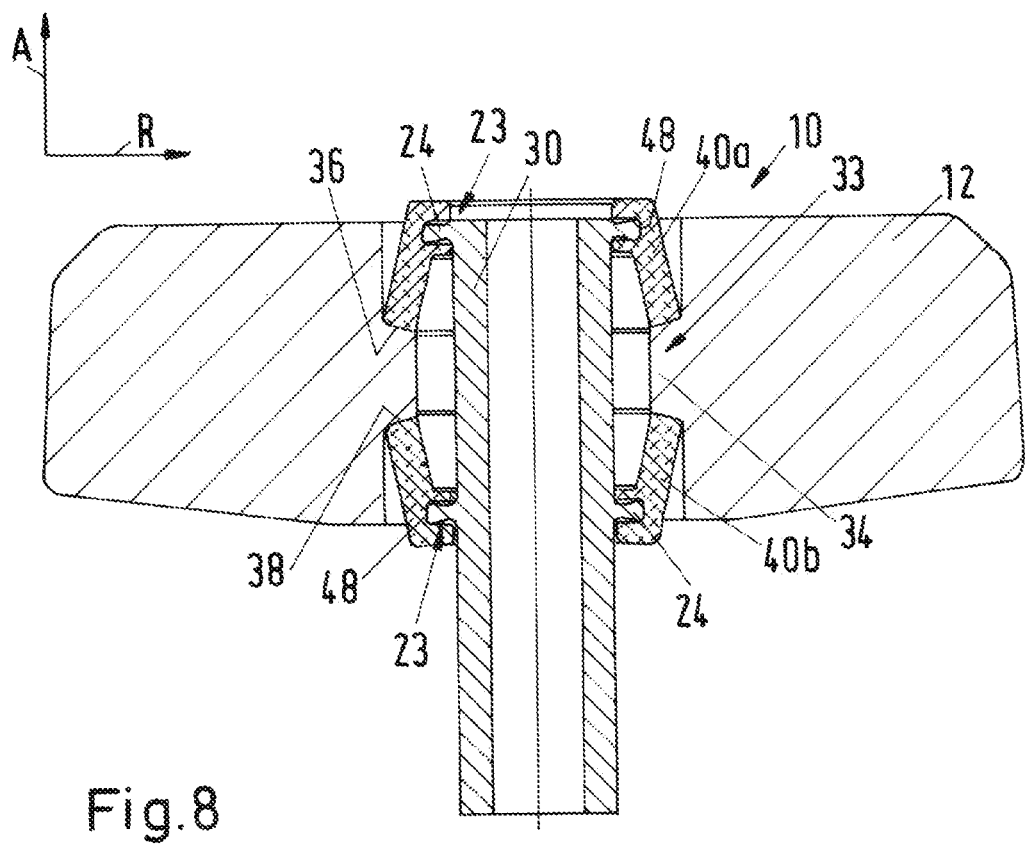
FIG. 8 generally illustrates a cross-sectional view of a damping device according to a fourth configuration.

FIG. 8 shows a fourth configuration of the damping device 10, which differs from the other configuration in that the supporting device 33 is formed on the mass element 12 in the form of the shoulder 34 forming the supporting surfaces 36, 38, and the fastening device 23 is formed on the sleeve 30 in the form of the projections 24, in which the grooves 48 of the rubber bodies 40a, 40b engage.

Figure 9:
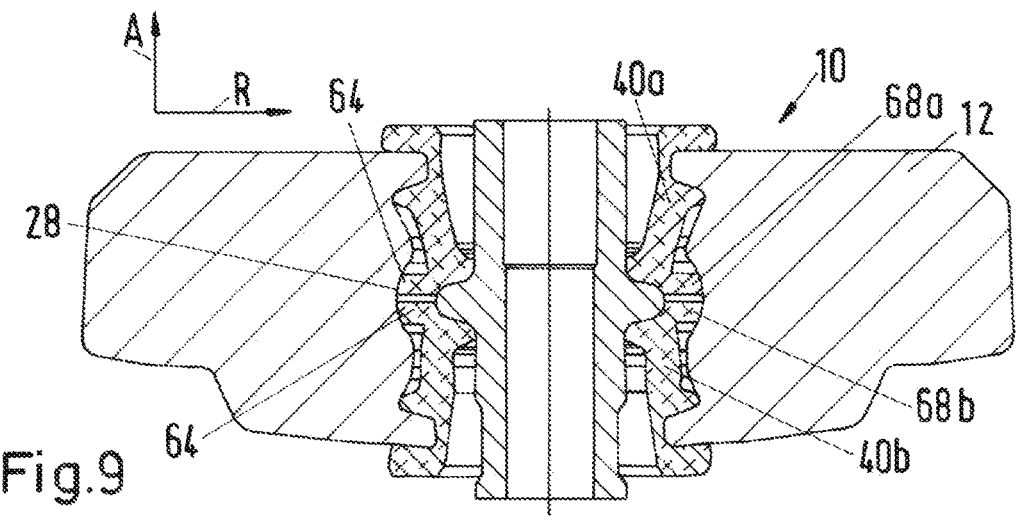
FIG. 9 generally illustrates a cross-sectional view of a damping device according to a fifth configuration.

FIG. 9 shows a fifth configuration of the damping device 10, which differs from the first configuration in that the rubber bodies 40a, 40b have radial rubber tracks 68a, 68b formed as radially outwardly projecting protrusions 64 that project into the semicircular recess 28 and contact the ground element 12. Radial rubber tracks 68a, 68b allow the frequency spread between radial and axial to be adjusted by the amount of stiffness between the rubber bodies 40a, 40b and the radial rubber tracks 68a, 68b formed as auxiliary springs. As a result, the damping device 10 is formed hard in the radial direction R and soft in the axial direction A.

Figure 10:
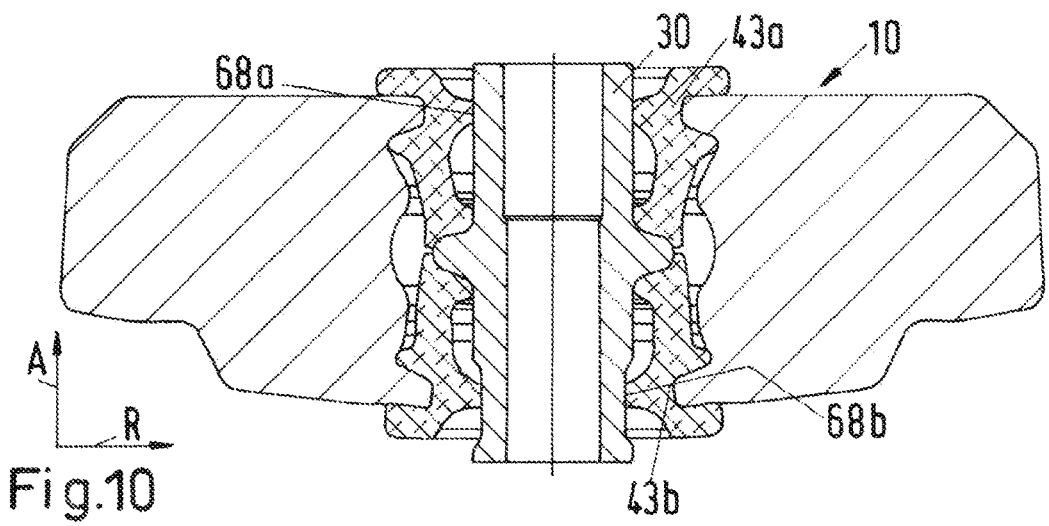
FIG. 10 generally illustrates a cross-sectional view of a damping device according to a sixth configuration.

In FIG. 10, a sixth configuration of the damping device 10 is shown, which differs from the fifth embodiment in that the radial rubber tracks 68a, 68b project radially in the region of the fastening sections 43a, 43b and rest against the sleeve 30.

Figure 11:
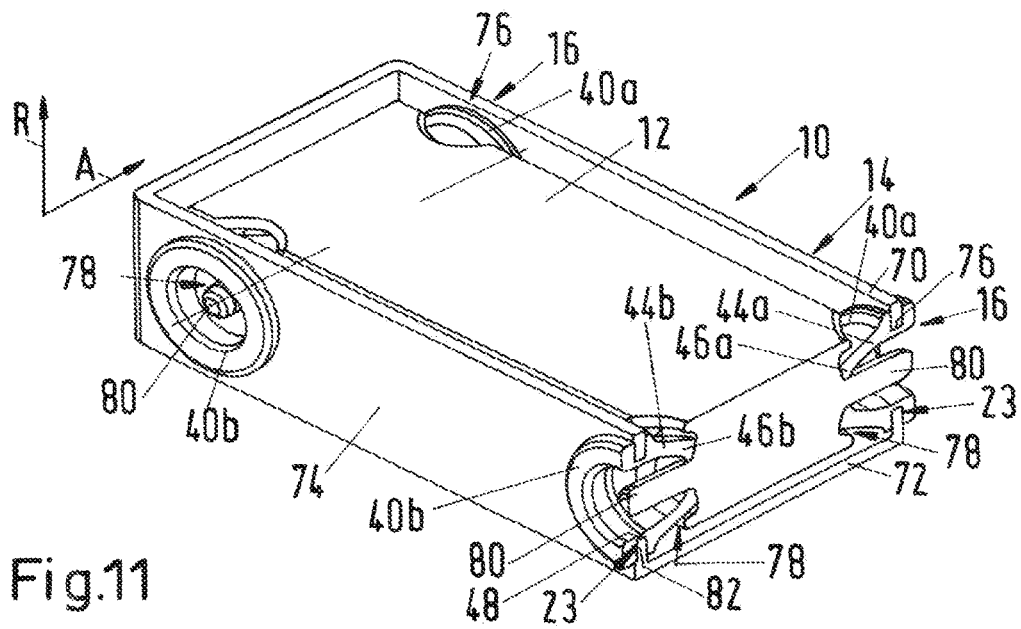
FIG. 11 generally illustrates a perspective view of a damping device according to a seventh configuration with a sectional view.
Figure 12:
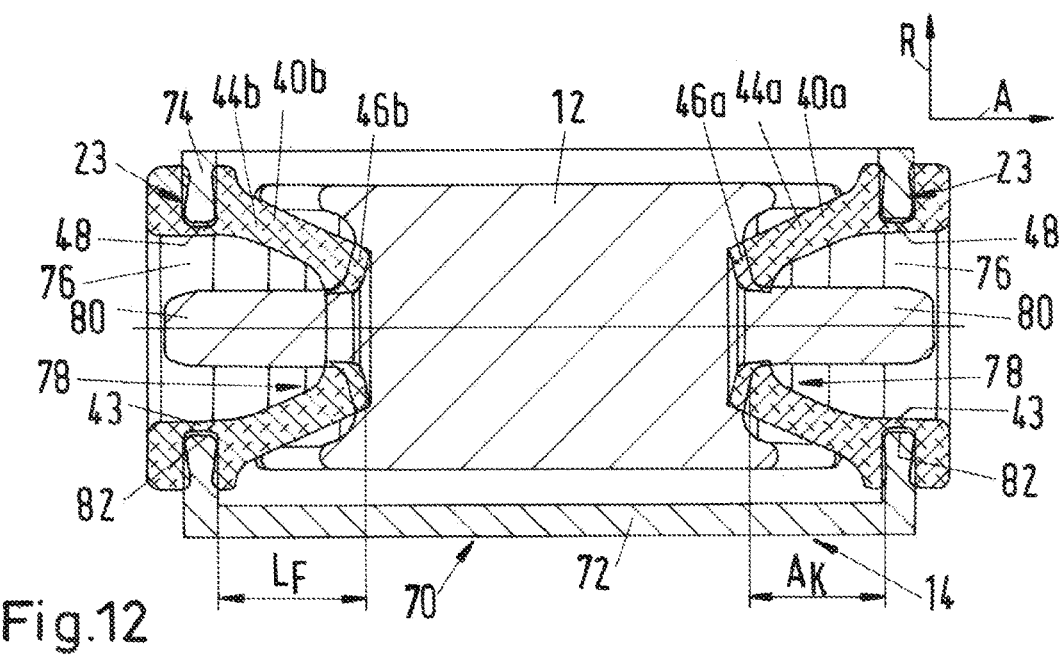
FIG. 12 generally illustrates an enlarged view of the sectional view of FIG. 12.

FIGS. 11 and 12 show a seventh configuration of the damping device 10, which differs from the other configurations in that the fastening element 14 is formed as a container 70 with a bottom 72 and side walls 74, within which the mass element 12 is accommodated so that it can vibrate. Holes 76 are made in the side walls for mounting the spring device 16.

The mass element 12 is shaped like a cuboid for insertion into the container and has four recesses 78, with a pin element 80 protruding from each recess 78.

In the seventh configuration shown in FIGS. 11 and 12, the spring device 16 has four sleeve-shaped rubber bodies 40a, 40b corresponding to the rubber bodies of the first embodiment. The rubber bodies 40a, 40b connect the mass element 12 to the container 70 in a manner capable of oscillation. For this purpose, one rubber body 40*a*, 40*b* is inserted in each case into a hole 76 of the side wall 74, so that the groove 48 engages positively around a hole edge 82 and the support section 46*a*, 46*b* bears against the bottom of the recess 78, which serves as a support device 33.

As can be seen in FIG. 12, the spring sections 44*a*, 44*b* surround the pin elements 80 so that the pin elements 80 abut the rubber bodies 40*a*, 40*b* in the region of the hole edge 82 and thus limit deflection of the mass element 12 relative to the container 70. In addition, the pin elements 80 together with the hole edges 82 form the loss prevention device 62, which acts in the radial direction R in the present case.

In the configuration shown in FIGS. 11 and 12, a length LF of the rubber body 40*a*, 40*b* between the fastening section 43 and the support sections 46*a*, 46*b* is greater than a distance AK between the mounting device 23 and the bottom of the recess 78 in the unmounted state. As a result, the rubber body 40*a*, 40*b* is compressed and prestressed when it comes into contact with the mass element 12 and thus exerts a contact pressure on the mass element 12, which fixes the mass element 12 in a form-fitting and force-fitting manner between the support sections 46*a*, 46*b*.

Figure 13:
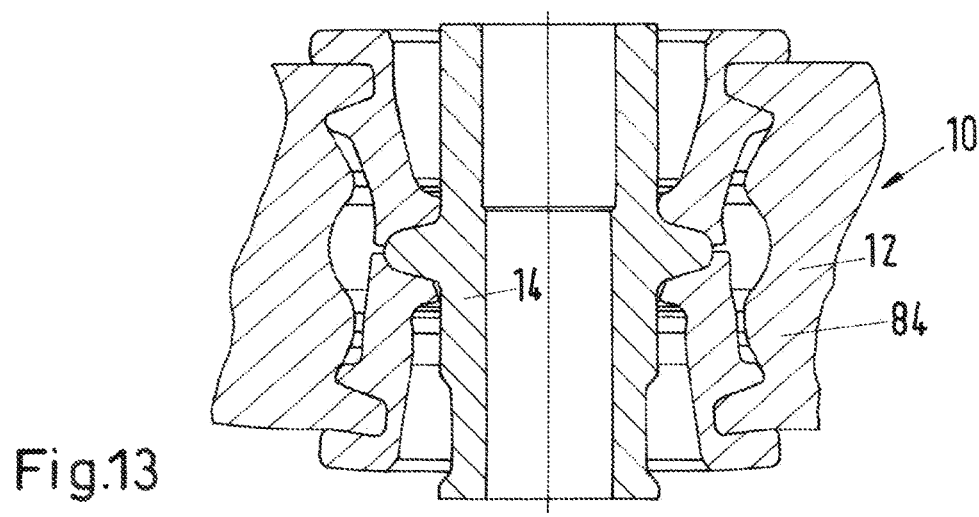
FIG. 13 generally illustrates a cross-sectional view of a damping device according to an eighth configuration.

In FIG. 13, an eighth configuration of the damping device 10 is shown, which differs from the first embodiment in that the ground element 12 is a vibrating vehicle component 84, such as a pump, a compressor, a control element or a power unit. The damping device 10 isolates and/or damps the vibrations of the vehicle component 84. For this purpose, the damping device 10 is attached via the attachment element 14 to a vehicle part not shown, which is adjacent to the vehicle component 84.

Figure 14:
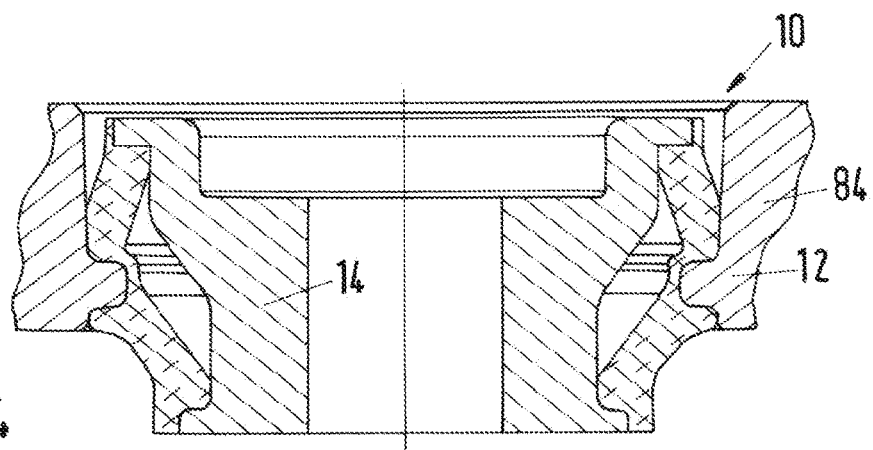
FIG. 14 generally illustrates a cross-sectional view of a damping device according to a ninth configuration.

In FIG. 14, a ninth configuration of the damping device 10 is shown, which differs from the second embodiment in that the mass element 12 is a vibrating vehicle component 84, such as a pump, a compressor, a control element or a power unit. The damping device 10 isolates and/or damps the vibrations of the vehicle component 84. For this purpose, the damping device 10 is attached via the attachment element 14 to a vehicle part not shown, which is adjacent to the vehicle component 84.

Due to the constructive pretension between the spring device 16, the mass element 12, the fastening element 14 and/or the vehicle part, the connection of the spring device 16 at least on one connection side is only possible by support, so that at least one of the support sections 46*a*, 46*b* can only be placed on one of the support surfaces 36, 38. In addition, both support sections 46*a*, 46*b* are pressed against both sides of the support surfaces 36, 38 due to the design bias, so that a form fit on both sides is generated from the pure support, which secures the spring device 16 to the ground element 12 or to the fastening element 14. This makes the damping device 10 simple and cost-effective to manufacture.

The invention claimed is:

1. A damping device for absorbing and/or damping vibrations of a vehicle part or for isolating and/or damping a vibrating vehicle component, the damping device comprising:
    at least one mass element,
    at least one fastening element for fastening the damping device to the vehicle part or to a vehicle part adjacent to the mass element, and
    at least one spring device that connects the mass element to the fastening element in a manner capable of oscillation,
    wherein the mass element or the fastening element have at least one fastening device for fastening the spring device, the other one of the mass element and fastening element or the vehicle part comprises at least two supporting devices for supporting the spring device, the spring device comprises at least one fastening means fixed to the fastening device and at least two supporting portions which are supported in an opposite axial direction on the supporting device, the fastening device and the at least two supporting devices are spaced apart from one another in the axial direction such that, when the supporting portions bear against the supporting devices, the spring device is prestressed; and
    wherein either the fastening device is arranged between the supporting devices in the axial direction, or the supporting devices are arranged between at least two fastening devices in the axial direction.

2. The damping device according to claim 1, wherein the spring device has a length between the fastening means and one of the supporting portions in a non-assembled state which is greater than a distance between the fastening device and at least one supporting device of the at least two supporting devices.

3. The damping device according to claim 1, wherein the supporting portions provide an axial overlap when in contact with the supporting devices.

4. The damping device according to claim 1, wherein the supporting portions are spaced apart in the axial direction.

5. The damping device according to claim 1, wherein the fastening means is fixed interlocking and frictionally to the fastening device.

6. The damping device according to claim 1, wherein the fastening means has at least one regionally circumferential groove, and in that the fastening device has at least one projection corresponding to the circumferential groove.

7. The damping device according to claim 1, wherein the supporting devices are formed as at least one shoulder or recess projecting at the mass element or at the fastening element.

8. The damping device according to claim 7, wherein at least one projection and at least one step have an overlap in a radial direction to form an anti-loss device.

9. The damping device according to claim 1, wherein the spring device comprises at least one axial stop and/or at least one radial stop which cooperates with the fastening element and/or the mass element to limit a deflection of the mass element relative to the fastening element.

10. The damping device according to claim 1, wherein the spring device has an additional radial track on its outer side and/or inner side.

11. The damping device according to claim 1, wherein the spring device is inserted into an opening of the mass element or of the fastening element, and in that at least a portion of the other one of the mass element or of the fastening element is inserted into a through-opening of the spring device.

12. The damping device according to claim 1, wherein the supporting portions and the supporting devices have a surface inclined with respect to a longitudinal axis of the damping device or a surface perpendicular to the longitudinal axis of the damping device.

13. The damping device according to claim 1, wherein the fastening means and each of the supporting portions are connected to each other via a spring section which is inclined with respect to a longitudinal axis of the damping device.

14. The damping device according to claim 1, wherein the spring device comprises at least one regionally sleeve-shaped rubber body, a regionally sleeve-shaped plastic body, or a regionally sleeve-shaped metal body.

15. A method for assembling a damping device that comprises at least one mass element, at least one fastening element for fastening the damping device to a vehicle part or an adjacent vehicle part, and at least one spring device which connects the mass element to the fastening element in a manner capable of oscillation, the method comprising:
- providing or inserting the at least one spring device into an opening of the mass element or the fastening element, so that a fastening means of the spring device positively engages a fastening device of the mass element or the fastening element; and
- extending or pressing at least a section of the fastening element or of the mass element into a through opening of the spring device until a first supporting portion of the spring device abuts against a first support surface of the mass element or the fastening element and a second supporting portion of the spring device abuts against a second support surface of the mass element or the fastening element, or inserting at least a portion of the fastening element or of the mass element into a through opening of the spring device until a first supporting portion of the spring device abuts against a support surface of the mass element or of the fastening element and a second support section of the spring device abuts against a second support surface of the vehicle part, and fastening the damping device to the vehicle part or a vehicle part adjacent thereto;
- wherein either the fastening device is arranged between supporting devices in an axial direction, or the supporting devices are arranged between at least two fastening devices in the axial direction.

16. A damping device for absorbing and/or damping vibrations of a vehicle part or for isolating and/or damping a vibrating vehicle component, the damping device comprising:
- at least one mass element,
- at least one fastening element for fastening the damping device to the vehicle part or to a vehicle part adjacent to the mass element, and
- at least one spring device that connects the mass element to the fastening element in a manner capable of oscillation,
- wherein the mass element or the fastening element have at least one fastening device for fastening the spring device, the other one of the mass element and fastening element or the vehicle part comprises at least two supporting devices for supporting the spring device, the spring device comprises at least one fastening means fixed to the fastening device and at least two supporting portions which are supported in an opposite axial direction on the supporting device, the fastening device and the at least two supporting devices are spaced apart from one another in the axial direction such that, when the supporting portions bear against the supporting devices, the spring device is prestressed; and
- wherein the fastening device is formed in one piece and is made from the same material as the fastening element or the mass element; the spring device is inserted into an opening of the mass element; and at least one section of the fastening element is inserted into a through opening of the spring device.

\* \* \* \* \*